(12) United States Patent
Han

(10) Patent No.: US 6,580,065 B2
(45) Date of Patent: *Jun. 17, 2003

(54) SCANNER WITH LIGHT DIRECTING CHANNEL

(75) Inventor: Loi Han, Alhambra, CA (US)

(73) Assignee: Microtek International, Inc. (TW)

( * ) Notice: Subject to any disclaimer, the term of this patent is extended or adjusted under 35 U.S.C. 154(b) by 0 days.

This patent is subject to a terminal disclaimer.

(21) Appl. No.: 10/011,324

(22) Filed: Oct. 22, 2001

(65) Prior Publication Data

US 2002/0040965 A1 Apr. 11, 2002

Related U.S. Application Data

(63) Continuation of application No. 09/169,161, filed on Nov. 13, 2001, now Pat. No. 6,316,766.

(51) Int. Cl.⁷ .................................................. H01J 3/14
(52) U.S. Cl. .................. 250/234; 250/227.26; 358/506; 358/474
(58) Field of Search ................................ 250/234, 216, 250/239; 358/474, 506, 509–511; 355/67, 113, 119

(56) References Cited

U.S. PATENT DOCUMENTS

| 5,140,443 | A | | 8/1992 | Iwahara |
| 5,463,217 | A | | 10/1995 | Sobol |
| 5,993,023 | A | * | 11/1999 | Lin ............................ 362/223 |
| 6,111,668 | A | * | 8/2000 | Seo ............................ 358/474 |
| 6,316,766 | B1 | * | 11/2001 | Han ............................ 250/234 |

OTHER PUBLICATIONS

Webster's Ninth New Collegiate Dictionary; Copyright 1985, Merriam—Webster Inc., p. 678.

* cited by examiner

*Primary Examiner*—Que T. Le
*Assistant Examiner*—Thanh X. Luu
(74) *Attorney, Agent, or Firm*—Coudert Brothers LLP

(57) ABSTRACT

A light diverting channel for use in a scanner. The channel is incorporated into the cover of a flat bed scanner and transmits light from the lamps positioned longitudinally along the scanner, up through the side of the channel, and through a central region or sheet of the channel, and then down through objects to be scanned. The light diverting channel thereby more efficiently uses the light generated by the lamps and more evenly disburses the light over and through the object to be scanned.

7 Claims, 3 Drawing Sheets

SCANNER WITH LIGHT DIRECTING CHANNEL

This is a continuation of application Ser. No. 09/169,161 which issued as U.S. Pat. No. 6,316,766 on Nov. 13, 2001.

BACKGROUND OF THE INVENTION

1. Field of the Invention

The present invention relates to optical scanners and, more particularly, to a scanner mechanism adapted for transmissive scanning and having a light transmitting channel to transfer light from the light source, typically a fluorescent tube placed along the edge of the platen on either side, of the scanner and to direct that light transmitted up through the platen and then over and around the object to be scanned and then reflected down to thereby provide for enhanced light over the entire area of the scanning platform and through the object to be transmissively scanned.

2. Description of the Related Art

Optical scanners are typically used to electronically reproduce visually perceptible images on materials, such as documents, photographs and transparencies, in a digital format for use by a computer. Once images have been stored on a computer, they may be altered and reproduced for any purpose, including the reproduction of high definition imaging for use in multimedia-type applications.

Optical scanners are available in a variety of configurations, tailored to the needs of the user. For example, a conventional flatbed scanner includes a light-receiving device mounted in a light-receiving seat. The seat is coupled to a pair of rails and is movably adjusted along the rails for scanning line-by-line documents and photographs for reflective scanning, and transparencies for transmissive scanning. The light-receiving device includes mirrors and a lens for focusing the image upon an elector-optical transducer, i.e., a charge coupled device (CCD) which then converts the light images into electrical signals. These signals are then digitized for use by a computer for reproduction and manipulation of the digitized image by commercially available software. In conventional scanners, the CCD is centrally mounted within the light-receiving device. The device may also include the use of a focusing mechanism for adjusting the distance between the lens and the CCD.

The light source or sources for conventional scanners, in particular, transmissive scanners, are usually fluorescent tubes placed so that light radiating outward from the tubes is transmitted through the transparency, through an optical pathway and eventually to the CCD. One problem with such scanners is associated with the uneven distribution of light from the light source over the entire area to be scanned. For example, the areas of the transparency closest to the light source will have greater intensity and the areas of the transparency farther away from the light source will have less light intensity. Inasmuch as the intensity of light varies as the inverse of the square of the distance from the light source, it is apparent that a wide range of intensities may result over the entire surface area of the transparency, depending on its size and distance from the light source and whether the scanner includes components to diffuse the light over the entire surface of the transparency.

OBJECT OF THE INVENTION

The primary object of the present invention is to provide a channel-shaped light transmission feature for transmissive scanning in an optical scanner, whereby light radiating from a light source is transmitted from a region adjacent to the light source to an area on one side of the object to be scanned, and is dispersed relatively evenly over the entire area of the object to be transmissively scanned, whereby more efficient use of the light emitting from the light source, and enhanced scanning of the object to be scanned results.

SUMMARY OF THE INVENTION

The present invention is directed to a mechanism and method for scanning transparencies within a conventional scanner adapted for transmissive scanning and using a conventional CCD-type image processing structure and capability. The mechanism includes a U-shaped channel which is incorporated within the cover or lid of a flatbed scanner and has its legs extending longitudinally along the outer edges of the platen of the scanner, and above fluorescent tubes positioned under the platen and along the longitudinal axis of the flatbed scanner. The inverted, U-shaped channel includes a reflective layer positioned adjacent the floor of a cavity formed in the scanner lid, a fiber optic light conduit for transmitting light upward from the legs and through the center, or base part of the U-shaped channel, and a collimating layer positioned adjacent the conduit layer on one side, and adjacent the platen of the scanner on the other side, for collimating light which has been transmitted through the polymeric conduit and reflected from the reflective surface to thereby direct the light through the object to be scanned and through an optical pathway to the CCD of the scanner.

The preferred light diverting channel of the present invention includes a polymeric conduit to serve as a wave guide, a reflective surface, and a collimating layer which includes a sheet having wedge-shaped collimators on one side and arcuate truncated edged lenses on its opposite side. With incorporation of the light directing channel of the present invention, the transmissive scanning is improved by virtue of more efficient transfer of light from the light source to and through the object to be scanned, and, also, more even distribution of light over the entire area of the object to be scanned.

BRIEF DESCRIPTION OF THE DRAWINGS

The objects and advantages of the present invention will become more readily apparent to those of ordinary skilled in the art after reviewing the following detailed description and accompanying documents wherein.

DESCRIPTION OF THE PREFERRED EMBODIMENTS

Figure 1:
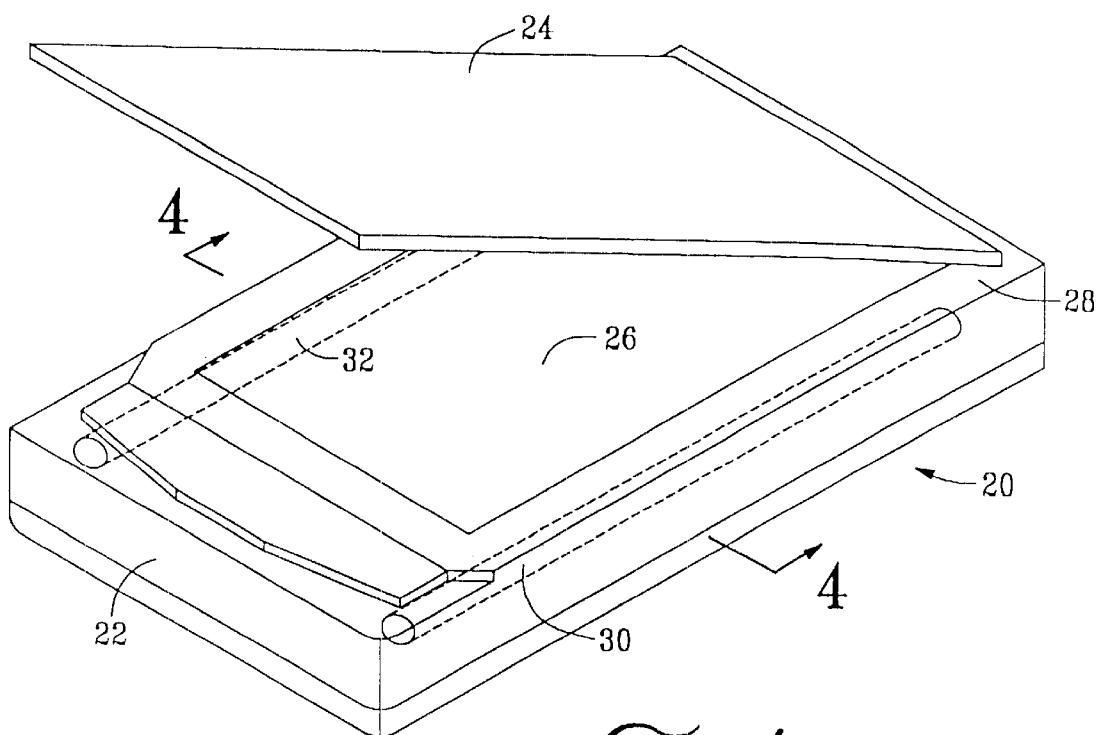
FIG. 1 is a perspective view of a preferred embodiment of the present invention.

Referring to the drawings more particularly by reference numbers, FIG. 1 shows a scanner 20 having a conventional housing 22 as used in a flatbed type scanner. The scanner also includes a cover 24, which is connected to the scanner by any conventional means, preferably by hinges located at one end, in a conventional fashion. The scanner also includes a conventional glass platen 26. The top surface of the scanner housing includes a border 28 which surrounds the rectangular platen 26. Shown in dotted lines in FIG. 1 are a first light source 30, and a second light source 32. Preferably these light sources are conventional, florescent tubes which extend longitudinally along the inside of the housing and provide a light source for illuminating the object to be scanned, which is placed on the platen 26. The scanner also includes, typically, a movable carriage which reciprocates along a rail or rails oriented longitudinally along the length of the housing. The carriage typically includes a scanning camera, usually including an electoroptic transducer, for example, a charge coupled device (CCD), focusing and/or collimating lenses, and one or more mirrors used to define a path of light through a transparent object, through the lens or lenses to the elector-optical transducer. The cover, or lid 24 is preferably hinged at one end, the hinges being conventional and not shown in FIG. 1.

Figure 2:
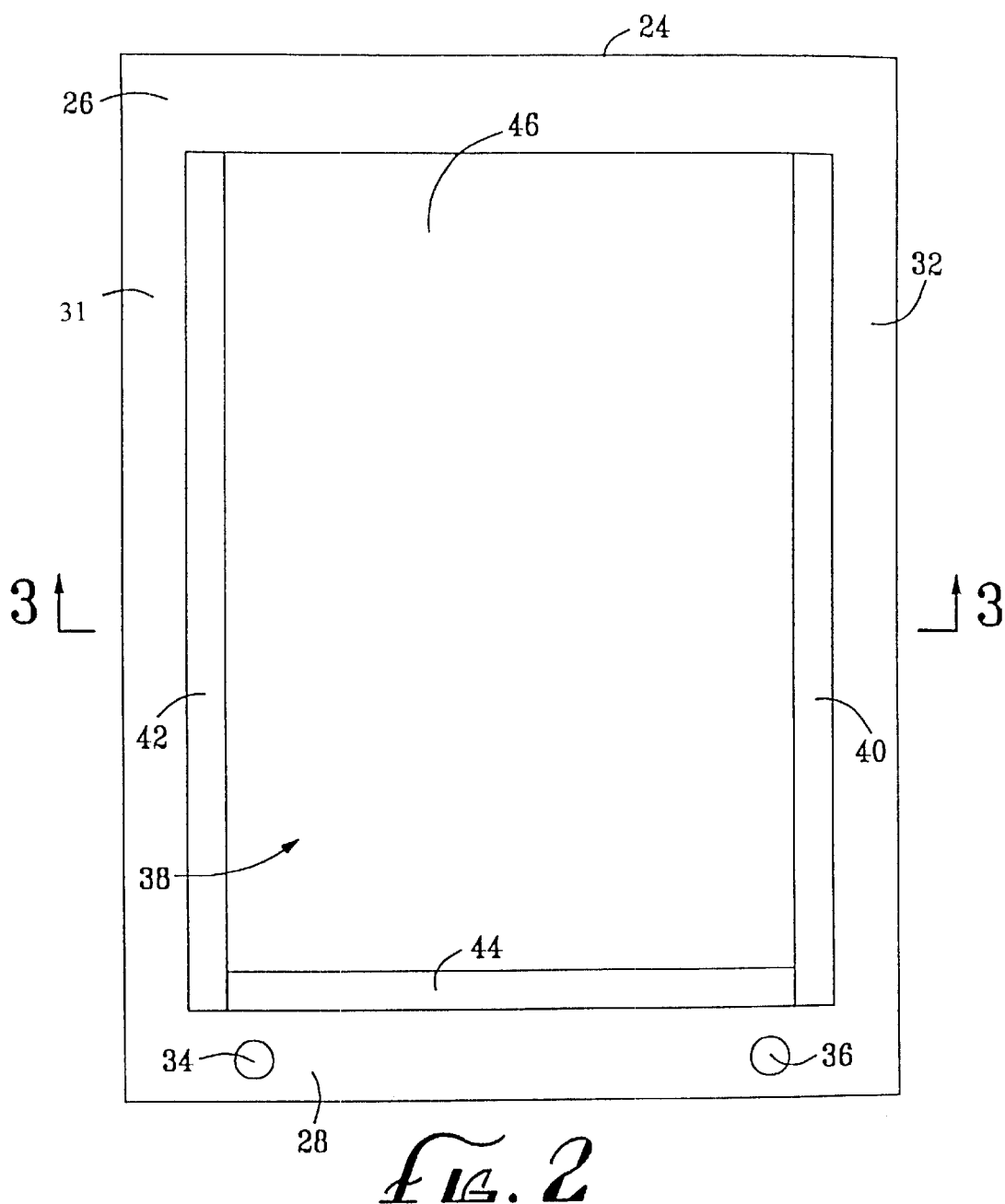
FIG. 2 is a bottom view of the cover of the FIG. 1 embodiment.
Figure 3:
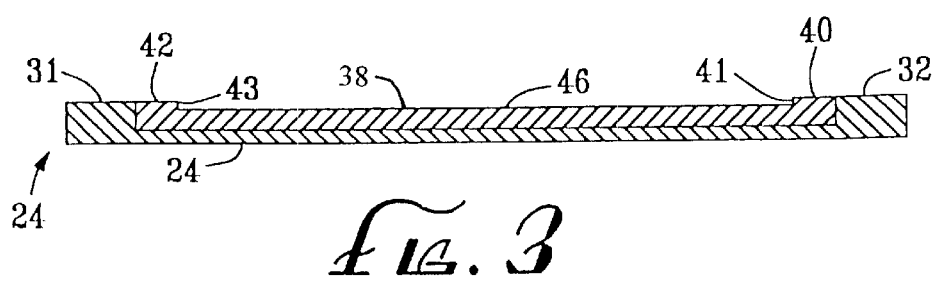
FIG. 3 is a cross-sectional view of the FIG. 2 cover, taken along line 3—3.

With reference to FIGS. 2 and 3, the cover 24, incorporating the light directing layer will be described. FIG. 2 is a bottom view of the cover or lid 24, with reference to FIG. 1 in which the top of the cover 24 is shown. The bottom of the cover 24 includes a first width-wise border 26 extending width-wise at a predetermined distance along the entire width of the end of the cover which is not hinged. At the hinged end of the cover another margin or border 28, shown having the same distance and also extending across the entire width of the cover 24 is shown. Mounting posts 34 and 36 are also shown for mounting the cover to hinges at the hinged end of the lid. Extending along the longitudinal direction of the cover are borders or margins 31 and 32, each of which is of a pre-determined width or distance. Inside of the borders or margins 26, 28, 31 and 32 is positioned a preferred embodiment light diverting channel 38 of the present invention.

Referring to both FIGS. 2 and 3, the light diverting channel 38 includes a central, rectangular area or surface 46 which is of a predetermined length and width, chosen to be large enough to overlie documents or other objects to be scanned. As shown in FIG. 3, in cross-section, the light diverting channel 38 has the form of a shallow, U-shaped channel with the distal ends or surfaces of each leg of the U being shown at 40 and 42. The height of the leg 40 is shown at 41 and the height of the leg 42 is shown at 43. When the cover is oriented so that it lies flat over the housing 22 of the scanner, the surfaces 40 and 42 of the light diverting layer 38 lie flat on the platen 26. The cavity formed by the platen 26 on the bottom, the central surface 46 of the light diverting layer 38 and the legs with the height shown at 41 and 43 provide space for the transparency, or other object to be positioned and permit the edges 40 to 42 to lie flat along the platen 26 of the housing. The light diverting channel is fastened within a cavity of the cover 24 by any conventional means such as by press fitting, with an adhesive, or with screws, brackets, or any other conventional means, so long as the fastener performs the function of retaining the light diverting channel within the cover and so as to permit the light diverting channel to perform its intended function of diverting light upward through the legs 40 and 42, across the central region 46, and then down through the object to be scanned. As is also apparent, the present embodiment is adapted for transmissive scanning, rather than reflective scanning. In this mode of operation, typically a transparency, such as a 35 mm slide, or larger transparency is the object to be scanned and the source of light is oriented so that it transmits light through the object to be scanned. Also shown on FIG. 2 is a rectangular region, or border, 44 which extends across the width of the central area 46 of the light diverting layer, and extends for a predetermined length, longitudinally, along the length of the cover. This region 44 is a calibration region, and, is preferably, of a white, reflecting surface, and is used for the scanning camera assembly and included software application to properly calibrate itself for scanning of an object.

Figure 4:
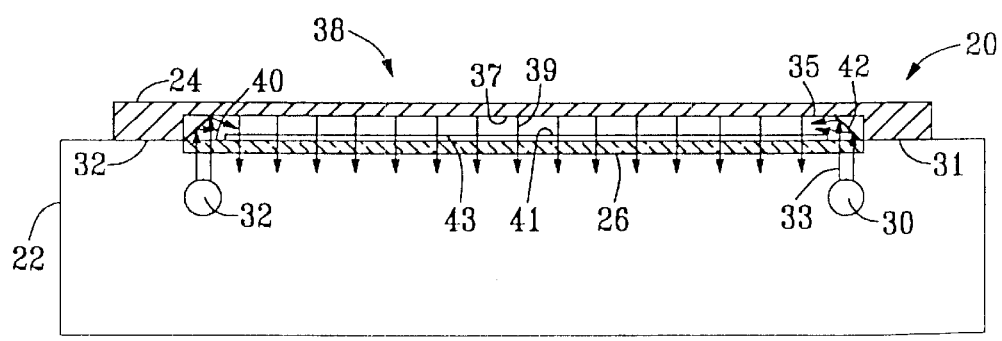
FIG. 4 is a cross-sectional view of the FIG. 1 scanner, taken along line 4—4.

With reference to FIG. 4, the path of light from the light source to the scanning camera will be described. FIG. 4 is a cross-sectional view of the FIG. 1 scanner taken through line 4—4, except that the lid 24 is shown as being fully closed in FIG. 4, whereas it is in an open position in FIG. 1. In FIG. 4 the cover 24 is shown in diagonal lines, and the light diverting channel is shown without lines, as well as the cavity formed above the platen and below the central region 46 of the light diverting layer 38 to facilitate explanation and understanding of the light path. The light sources 30 and 32 provide light radiating outward from the tubes, as is conventional. As shown in FIG. 4, two vertical arrows pointing upwards from each light source represent rays of light from the lights 30 and 32 directed upward through the surfaces 40 and 42 of the light diverting channel 38. As also represented schematically, the light is then reflected, as shown in FIG. 4 by light ray 33 being reflected to form light ray 35 directed into the body of the light diverter or light diverting channel 38.

As also shown in FIG. 4, light reflecting and transmitted within the light diverting channel 38 is reflected off of the reflecting layer 37. As represented schematically in FIG. 4, the light is then shown reflected from reflective layer 37 in a downward direction as shown by the arrows, one of which is numbered 39. The light being thus reflected downward passes through the interior layer of the light diverting channel 38, and through a collimating layer 41, as will be described in greater detail. The light then passes through the cavity formed by the platen 26 on the bottom and the light diverting channel 38 at the top and two sides. The cavity for holding the object to be scanned is shown at 43 in FIG. 4.

The light diverting channel 38 of the present invention is essentially an optical conduit and functions to transmit light from the light sources 30 and 32 around the edges of the object to be scanned, and then is diffused and evenly spread out and thus to transmit light over the object to be scanned, as best shown in FIG. 4. The light diverting channel 38 must, therefore be made of a material that functions to transmit light. Preferably, the light transmitting channel is made of a three-layer or three-component optical interconnection which includes a reflective layer, a polymeric transmissive layer, and a collimating layer. The most preferred light diverting layer is available from Allied Signal Corporation as corrective optical films which include three such functional layers. The first layer is the central or light transmitting conduit or pipe, which is preferably of a polymeric material such as polymethylmethacrylate (PMMA). The PMMA layer is in the center, and at one edge a reflective layer is positioned. The reflective layer 37, as shown in FIG. 4, is adjacent the surface of the cover which forms the cavity into which the light diverting channel 38 is placed. The third layer of the light diverting channel 38 is a collimator layer, shown at 41, in FIG. 4.

The PMMA light conduit, and the reflective layer are conventional. Numerous materials may be used to form an equivalent light conduit or light pipe and reflective layer, as will be appreciated by those skilled in this art. The collimator layer, or sheet 41, however, is of, most preferably, a very specific design, as will be shown and described with reference to FIGS. 5 and 6.

Figure 5:
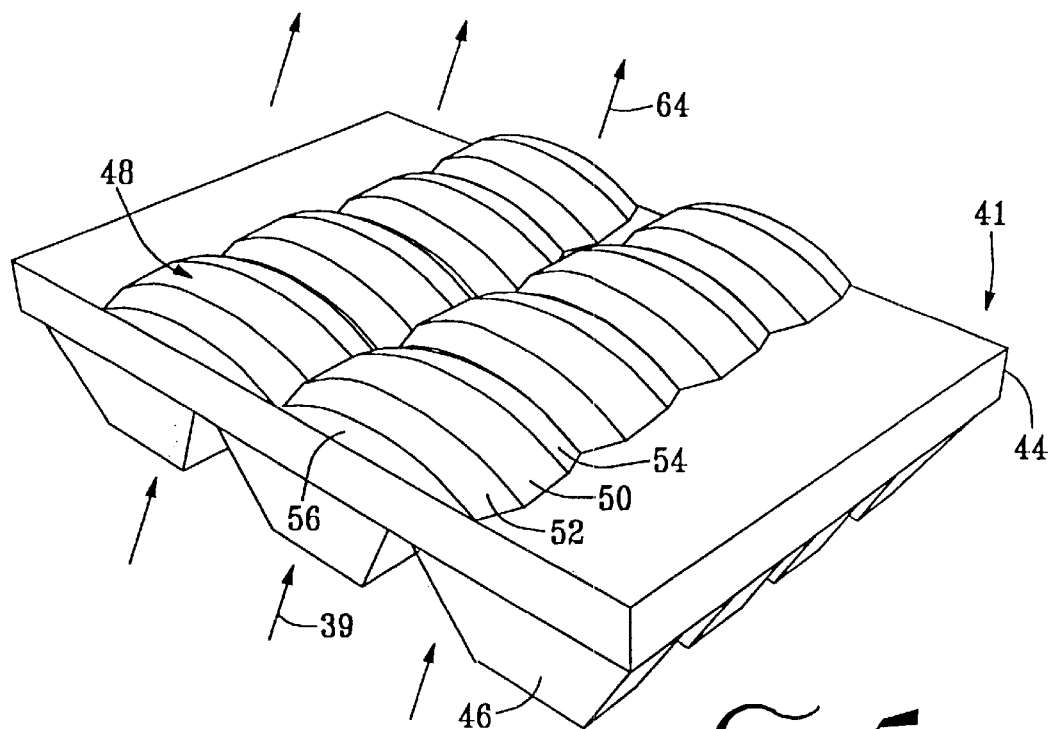
FIG. 5 is a top, side perspective view of a section of the collimation sheet used in the preferred embodiment.

FIG. 5 shows a small portion of the collimation sheet 41 from a bottom, side perspective view with reference to FIG. 4. In other words, the light which has been transmitted from the light sources 30 and 32 up through the legs 40 and 42 of the light diverting channel 38, and through the polymeric light conduit and reflected downward from the light reflecting layer 37, is shown at arrow 39, and passes through the wedge-shaped collimator elements or lenses one of which is shown at 46, and then outward and downward through the arcuate lenses or lens segments 48.

As shown in FIG. 5, the arrow 39 represents the light being transmitted through the collimation sheet, and is oriented in a direction opposite that of FIG. 4, for the purpose of better illustrating the arcuate lens elements 48.

Figure 6:
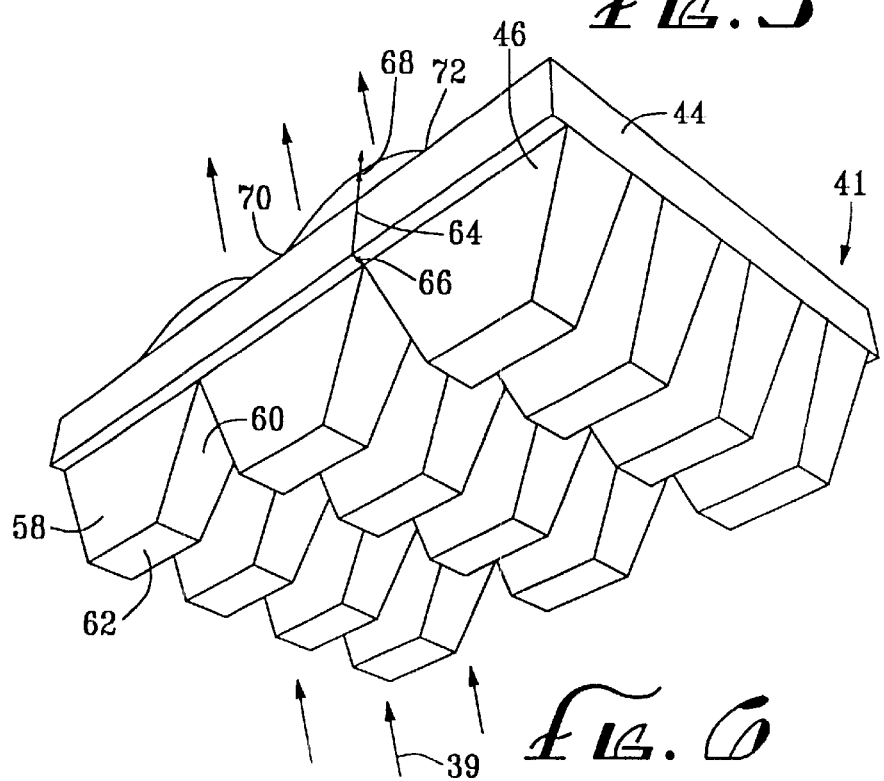
FIG. 6 is a bottom, side perspective view of the FIG. 5 collimation sheet.

With reference to FIG. 6, a top view of the same segment 41 of the collimating layer is shown, with light being transmitted in the direction shown at arrow 39 through the wedge-shaped lenses or collimators 46. The collimation sheet in turn includes three layers or sub-layers. The substrate layer 44 is shown as a generally, rectangular sheet having a predetermined thickness. Positioned on one side of the sheet is a series of wedge-shaped lenses or collimator elements 46. These wedge-shaped lens or collimators 46 include a relatively broad, rectangular base adjacent the sheet 44, and sloping sides 58 and 60, as shown in FIG. 6, which terminate in a flat, rectangular top 62. As may be appreciated, the area of the top or base 62 is smaller than the area of the base or rectangular area which meets with the sheet 44. On the opposite side or surface of the sheet 44 is positioned a plurality of arcuate lenses 48. These arcuate lenses have the appearance of a small segment or sector of a tire, in that they have a central, flat radial band 50 with tapered edges 52 and 54 which terminate along one edge at the central band 50 and at the opposite end along an edge 56. As is also apparent from FIGS. 5 and 6, the collimation lenses 46 and the dispersion lenses 48 are oriented in columns and rows on opposite sides of the sheet 44, and the central regions of each row of lenses extending along in one direction is oriented to straddle a line which extends in the same direction and represents and defines where each adjacent row of lenses meet. For example, as shown in FIG. 6, line 64 having double arrowheads 66 and 68 illustrate this orientation. The end of the line 64 at arrowhead 68 is shown in the central, or highest region of a row of arcuate lenses 48. The opposite end of the line 64, shown at arrowhead 66, illustrates and shows the line where collimation wedges 46 meet. The edges 70 and 72 of the arcuate lenses 48 are shown in FIG. 6, positioned so that the row of lenses 48 straddles the line 64, and thus the line along which two adjacent rows of collimation wedges are positioned. or sector of a tire, in that they have a central, flat radial band 50 with tapered edges 52 and 54 which terminate along one edge at the central band 50 and at the opposite end along an edge 56. As is also apparent from FIGS. 5 and 6, the collimation lenses 46 and the dispersion lenses 48 are oriented in columns and rows on opposite sides of the sheet 44, and the central regions of each row of lenses extending along in one direction is oriented to straddle a line which extends in the same direction and represents and defines where each adjacent row of lenses meet. For example, as shown in FIG. 6, line 64 having double arrowheads 66 and 68 illustrate this orientation. The end of the line 64 at arrowhead 68 is shown in the central, or highest region of a row of arcuate lenses 48. The opposite end of the line 64, shown at arrowhead 66, illustrates and shows the line where collimation wedges 46 meet. The edges 70 and 72 of the arcuate lenses 48 are shown in FIG. 6, positioned so that the row of lenses 48 straddles the line 64, and thus the line along which two adjacent rows of collimation which are positioned.

During operation, the object to be scanned is placed on the platen 26, the cover 24 is shut, and the scanner is energized in a conventional fashion. The lights 30 and 32 are energized, and light is transmitted up through the legs 40 and 42 of the light diverting channel, where it is reflected 900 and transmitted inward toward the center region 46 of the light diverting channel. In this region the light is ultimately reflected from the surface 37, and then downward, as shown in FIG. 4, and upward in FIGS. 5 and 6, through the collimation wedges, the layer 44 and the lenses 48, and then through the object to be transmissively scanned. As may be appreciated from the above description, a greater amount of light generated by the light sources 30 and 32 is transmitted to the object to be scanned, and that light is more evenly dispersed over the surface area of the object than would be without the channel.

Thus, with the present invention, for a given amount of light, greater efficiency is achieved because a greater amount of light is transmitted to the object to be scanned, and with a given amount of light transmitted to the object to be scanned, improved scanning results, because the light is distributed more evenly over the entire object to be scanned than in conventional designs. Similarly, with use of the present invention, it is envisioned that smaller, and therefore less costly, light sources may be used to achieve the same degree of illumination on the surface of the object to be scanned, in comparison to conventional designs.

A conventional central processing unit (CPU) (not shown) connected within the scanner controls the movement of the scanner. The CPU includes a software program which provides the means for the CCD and lens to be correspondingly adjusted in response to selection of a desired scanning mode.

While the present invention has been described in connection with what are presently considered to be the most practical and preferred embodiments, it is to be understood that the invention is not to be limited to the disclosed embodiments, but to the contrary, is intended to cover various modifications and equivalent arrangements included within the spirit of the invention, which are set forth in the appended claims, and which scope is to be accorded the broadest interpretation so as to encompass all such modifications and equivalent structures.

What is claimed is:

1. An optical scanner cover comprising:

a cover having top surface, a length dimension, a width dimension and a thickness dimension, wherein the length dimension is the longest dimension;

a light transmitting channel mounted within said cover;

said light transmitting channel including a plurality of adjacent interconnected layers, each said layer having a length, a width and a thickness which is small relative to said length and said width, wherein said plurality of layers comprises;

a reflective layer adapted to reflect light therefrom;

a light transmitting layer adapted to transmit light therethrough; and a collimating layer adapted to collimate light passing through said collimating layer.

2. An optical scanner cover comprising:

a cover having top surface, a length dimension, a width dimension and a thickness dimension, wherein the length dimension is the longest dimension;

a light transmitting channel mounted within said cover;

said light transmitting channel including a plurality of adjacent interconnected layers, each said layer having a length, a width and a thickness which is small relative to said length and said width, wherein said plurality of layers comprises;

a reflective layer adapted to reflect light therefrom;

a light transmitting layer adapted to transmit light therethrough; and a collimating layer adapted to collimate light passing through said collimating layer;

said light transmitting channel is U-shaped and spatially defines a base portion and two leg portions, each leg portion essentially perpendicular to said base portion;

the base portion of the U includes said reflective layer, said light transmitting layer and said collimating layer;

said reflective layer is overlaid by and in contact with said light transmitting layer which in turn is overlaid by and in contact with said collimating layer; and said reflective layer, said light transmitting layer and said collimating layer are disposed such that said collimating layer is the outermost of said plurality of layers.

3. The optical scanner cover of claim 2 wherein:

the two leg portions and the base portion of the U-shaped light diverting channel include the light transmitting layer.

4. The optical scanner cover of claim 3 wherein:

said light transmitting layer is made of a polymeric material.

5. The optical scanner cover of claim 2 wherein:

the two leg portions of the light directing channel extend along the longitudinal axis of said cover and are positioned at an outer periphery of said cover.

6. The optical scanner cover of claim 2 wherein said light transmitting channel has an area of predetermined length and width sufficient to overlie an object to be scanned.

7. The optical scanner cover of claim 2 wherein:

said collimating layer includes wedge-shaped collimator lenses on its surface adjacent said light transmitting layer and arcuate truncated edged lenses on its opposite surface.

* * * * *